3 Sheets--Sheet 1.
GEORGE LITTLE.
Improvement in Electric Telegraph Apparatus.
No. 125,582.                          Patented April 9, 1872.
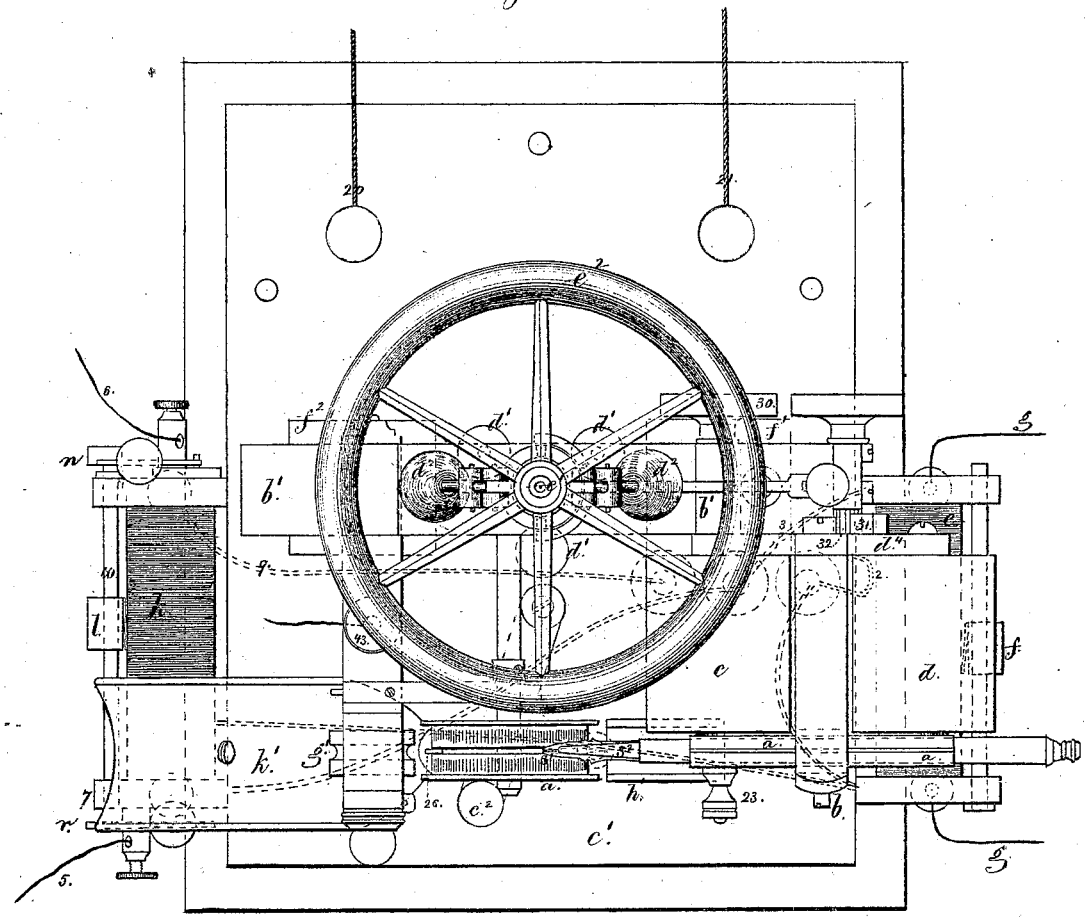
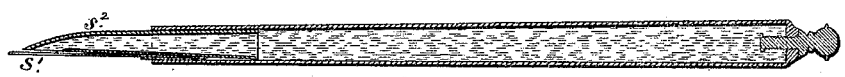
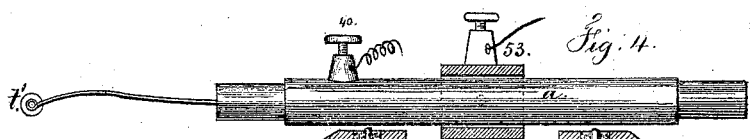

3 Sheets--Sheet 2
GEORGE LITTLE.
Improvement in Electric Telegraph Apparatus.
No. 125,582. Patented April 9, 1872.
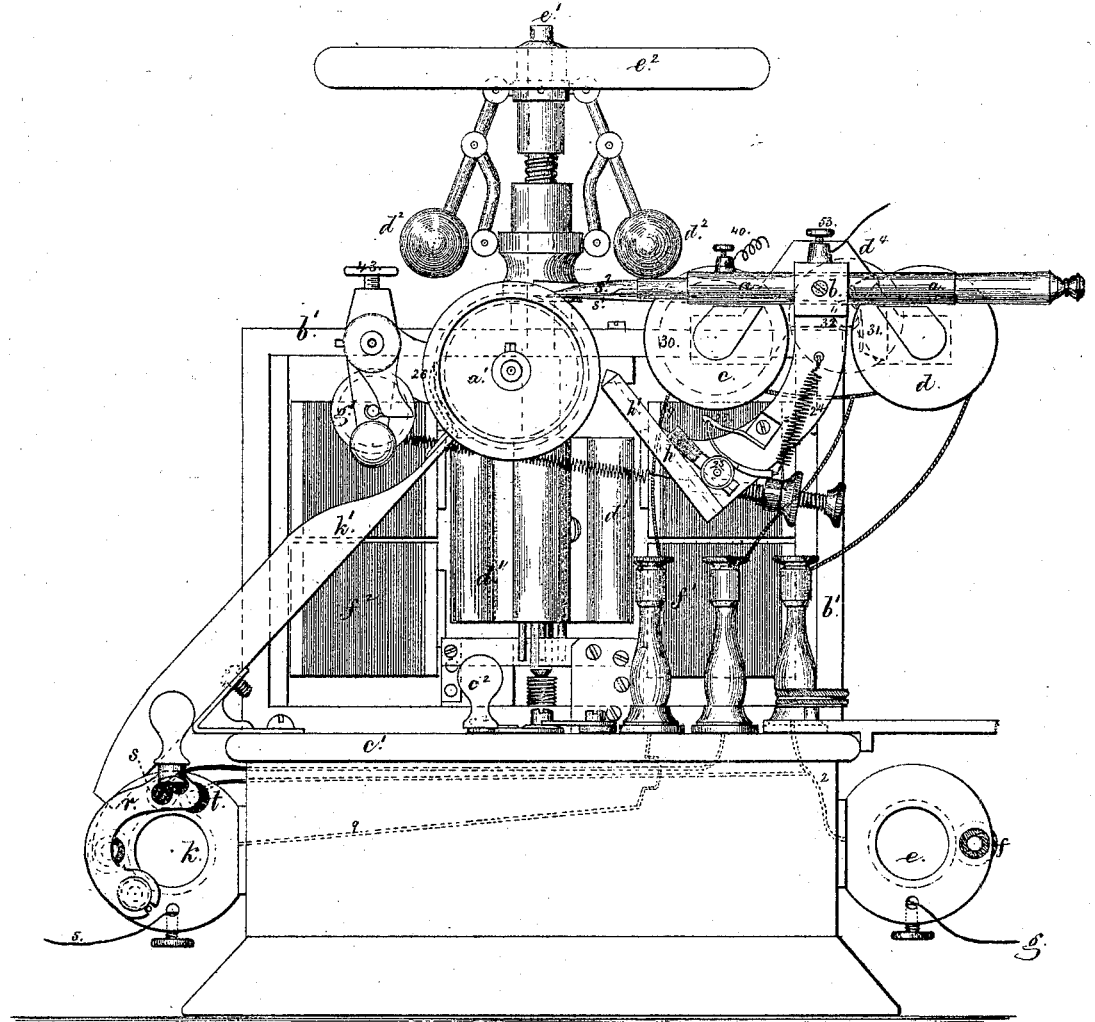
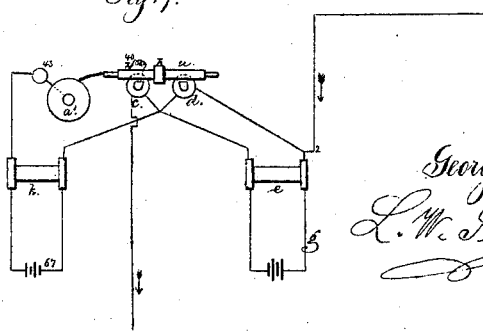

3 Sheets--Sheet 3.

GEORGE LITTLE.

Improvement in Electric Telegraph Apparatus.

No. 125,582. Patented April 9, 1872.

UNITED STATES PATENT OFFICE.

GEORGE LITTLE, OF RUTHERFORD PARK, NEW JERSEY.

IMPROVEMENT IN ELECTRIC-TELEGRAPH APPARATUS.

Specification forming part of Letters Patent No. 125,582, dated April 9, 1872.

*To all whom it may concern:*

Be it known that I, GEORGE LITTLE, of Rutherford Park, in the county of Bergen and State of New Jersey, have invented an Improvement in Electric Telegraphs; and the following is declared to be a correct description of the same.

This invention relates to an instrument that is adapted to transmitting or receiving telegraphic messages, and also to the arrangement of telegraphic circuits, whereby the instrument is adapted to sending or receiving through an ocean cable.

The two magnets, with a vibrating armature and two electric currents regulated by rheostats, are employed somewhat similar to those set forth in my patents Nos. 123,490 and 122,266; but the magnets are adjustable and are employed to move an armature carrying either a pen of peculiar construction used in receiving, or a circuit-breaker in transmitting.

Figure 5:
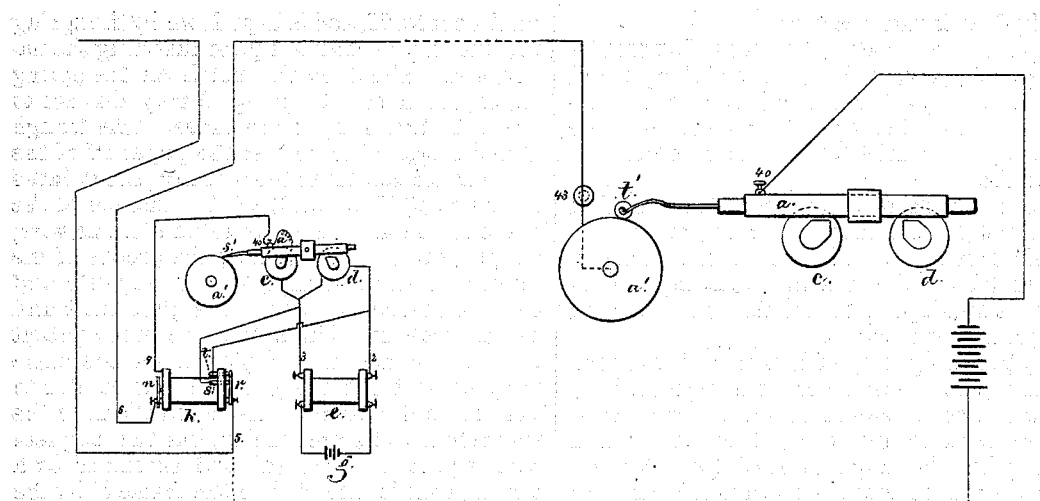
Figure 6:
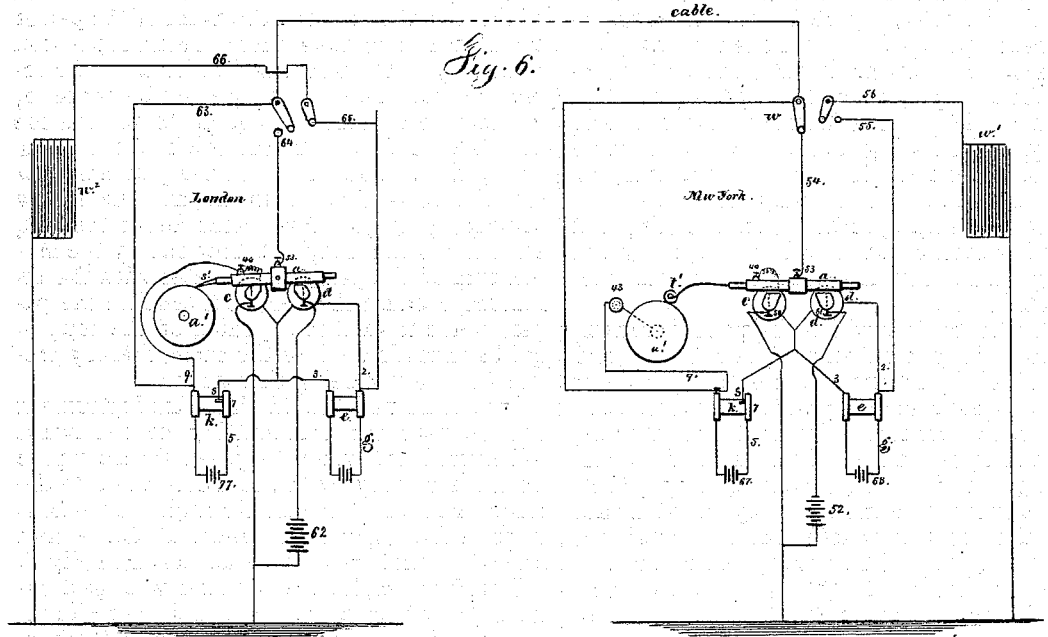

In the drawing, Figure 1 is a plan of the instrument complete and with the receiving-pen in place. Fig. 2 is an elevation of the said instrument. Fig. 3 is a section of the pen. Fig. 4 is a section of the transmitting-disk and spring, and showing also the connections on the instrument employed with submarine cables. Fig. 5 is a diagram illustrative of the connections employed at the transmitting and receiving stations on land lines; and Fig. 6 is a diagram to show the connections with submarine cables.

The roller $a'$, over which the paper is drawn, is mounted upon a frame, $b'$, and bed $c^1$, and is revolved by means of a magnetic or other motor. I have shown a magnetic motor composed of the armatures $d^1$ upon a vertical shaft, $e^1$, at the upper end of which is the fly-wheel $e^2$ and governor-balls $d^2$, the magnets $f^1 f^2$ acting to revolve the armatures by the alternate attraction, as in my patent dated November 2, 1869, No. 96,332. The battery connections 20 21 for the motor lead through the key $c^2$, so that the motor may be stopped or started by making or breaking the circuit through the key. The roller $g'$ is brought into contact with the strip of paper to press the same to $a'$ and cause the movement of the paper, or swung away from the same to stop the movement. The paper passes in through the trough $h^1$ beneath the brush $h^2$, and this brush swings upon the center 23, and is kept down by the spring 24, but may be turned up for inserting the paper, and be held by the notch on the spring 25, or the notched spring 25 may also act to press the brush upon the paper. The trough $k'$ and finger 26 to deliver the paper off of the roller $a'$ are similar to those in my patent dated February 6, 1872, No. 123,491. Instead of the blade in the groove of the roller $a'$ a fine wire, cat-gut, or cord may occupy the groove of the roller, the ends passing off as tangents and being attached in place. The rheostat $k$ and switches $n$ $r$ are similar to those in my patent No. 123,490, and are employed for the same purpose, and the rheostat $e$ is also similar to that in said patent. The connections to the magnets $d$ and $c$ are similar, but the magnets $d$ $c$ are placed horizontal and sustained by a bar, $d^4$, that is attached to the frame $b'$ by the clamping-screw 30, and the disk 31 and pinion 32 are employed to raise or depress that end of the bar $d^2$ and move the point of the pen or the transmitting roller into the correct position relatively to the paper and roller $a'$. The armature $a$ is made to swing upon its center $b$, and said armature is tubular to receive the handle of the pen $s^1$ or the stock of the roller or stylus $t'$. The handle of the pen is hollow (see Fig. 3) to form a fountain, and the hollow ink-supplying quill $s^2$ is placed above the pen, so that the ink may not flow out by the momentum of the pen as it vibrates with the armature, because the pen, as it touches the paper, bends toward the opening of the supply-quill and tends to close the same, thereby preventing the ink being thrown out.

It is to be understood that this instrument can be used for transmitting or receiving. When used for transmitting the pulsations pass from the battery by the connections 40, to the roller or rollers $t'$, thence through the perforations in the paper to the roller $a'$, frame, and line-wire binding-screw 43, as shown in Fig. 5.

I prefer to make use of paper with perforations in two or more lines, and the rollers $t'$ are placed in the proper line to pass through the said perforations and close the circuit by contact with the roller $a'$.

At the receiving-station the rheostat $k$ causes the proper portion of the current to pass through the magnet $c$, and the remainder passes by $r$ either to the earth or on to the next station. The electric pulsation in the magnet $c$ attracts the armature and brings the pen into contact with the paper, and, according to the position of the switches $n\ r$, so a portion of the main current will pass through the magnet $d$ in the opposite direction to the constant current from the battery $g$, and neutralize the same, or else the current in the electro-magnet $c$ must be sufficiently powerful to attract the armature $a$, overcoming the force of the electro-magnet $d$.

At the terminal station the connections will be precisely the same as at the intermediate station, except that the wire 5 from $r$ will lead to the earth, as indicated by dotted lines.

In using this instrument with submarine or ocean cables the connections will be arranged substantially as shown in Fig. 6. The receiving-instrument at one end is operated by the pulsation or electric wave moving toward the transmitting-instrument; and, when the wave or electric pulsation moves toward the receiving-instrument, that instrument becomes inoperative, and the condenser is surcharged to produce the next signal upon moving toward the transmitter.

The connections are shown as arranged for transmitting from New York and receiving at London, there being a roller, $t'$, Fig. 4, in the transmitting-instrument and a pen, $s^1$, Fig. 3, in the receiving-instrument. The spring from the armature $a$ on which the roller $t'$ is mounted allows of the armature swinging without lifting the rollers.

The armature $a$ as it vibrates closes, alternately, the circuits through the insulated binding-screws 50 and 51, and in the connections there are switches of any desired character to direct the current as next described.

The condenser $w^1$ at New York is out of action and the condenser $w^2$ at London is in the circuit. The battery 52 at New York is in action, the battery 62 at London is out of action, the circuit at 64 being open.

When the circuit between $t'$ and $a'$ is closed by contact through the perforated paper the current passes from the battery 67 through $s, c, 40, t', a', 43$, to $k$, and back to 67, the force of this current being adjusted with accuracy by the slider of the rheostat at $k$, diverging the proper proportion of the current over the aforesaid route and returning the remainder to the battery. The force of this current is sufficient to bring $a$ into contact with 50, and close the circuit at this point, so that the electric wave, pulsation, or leakage, comes from the cable through 54 53 $a$ 50 to earth. When the paper intervenes the circuit from 67 is broken, and the battery 68, that is acting constantly in $d$, draws the armature $a$, closing the circuit from battery 52, through 51 $a$ 53 54 to the cable, sending the pulsation away from the transmitting-instrument to replenish the condenser $w^2$.

In this way the electric wave is made to flow over the cable toward the transmitter when the circuit from $k$ is closed through the perforation in the paper and away from the same when the said circuit is broken by the intervening paper.

I have shown the constant circuit from 68 acting in $d$, but by connections, such as before described, the circuit from 67 might also pass through $d$, but in the opposite direction, to neutralize the magnetism in $d$ instead of the magnetism in $c$ being sufficiently powerful to overcome that in $d$.

At the receiving-station, marked London, the pulsation or wave from $w^2$ passes by 66 65 2, through $d\ c$ 40 9 63, to cable when moving toward the transmitting-station, and the reverse when the battery 52 is charging the condenser $w^2$; hence when the mark is to be made by the pen $s^1$ being brought down on the paper correspondingly with the pulsation through the perforated paper, the current moving from 2 through $d, c,$ 40, and 9, intensifies the action of the battery 77 in $c$ by moving in the same direction, and neutralizes that in $d$; hence the core of $c$ will attract $a$, and when the electric wave moves from 9 through 40 $c\ d$ 2 the reverse effect is produced; the magnetism in $c$ being neutralized and intensified in $d$ the pen is lifted.

It will be now understood that the rheostats $e$ and $k$ are to be adjusted to furnish only the required strength of current, and the action of the magnets $c\ d$ on the armature is balanced; but when a cable current is also passed through the magnets $c\ d$ one is made more powerful and the other is correspondingly weakened, and the reverse when the current is of opposite polarity; hence with a very feeble cable current the most reliable movements are given to the armature $a$, and the pen applied thereto.

I remark that these arrangements of circuits may be used to give motion to any other recording or indicating instrument, or to a circuit-breaker, to bring into action a relay or repeater; and although this arrangement is set forth as applied with submarine cables, the same might be used on land.

Chemical paper and a stylus might be employed in place of the pen and ink-fountain. In this case the connections may be arranged as in Fig. 7, in which the main-line current neutralizes the current from $g$ in $d$, and magnetizes the core of $c$, bringing the iron or steel stylus down upon the chemical paper upon $a'$, and completing the circuit from 67, through $k$ $c$ 40, stylus $a'$ 43 to $k$, and pressing the stylus firmly upon the paper. When the main-line circuit is broken the magnet $d$ raises the stylus, the force of the current being regulated at $k$ so as to be less in $c$ than that in the magnet $d$.

I claim as my invention—

1. The adjustable magnets and swinging armature, substantially as set forth, in combination with a recording-pen or stylus, and mechanism for moving the paper, substantially as set forth.

2. The swinging armature $a$, in combination with the circuit-closers 50 51, electro-magnets

*c d*, constant circuit connections and transmitting-roller or stylus *t'*, substantially as specified.

3. Two constant circuits, regulated by adjustable rheostats, and acting in electro-magnets, in combination with a perforated paper transmitting apparatus, a main-line circuit, and vibrating armature circuit-breaker, substantially as set forth.

4. Two electro-magnets and their constant circuits, arranged in a main-line circuit, substantially as set forth, so that the main current of one polarity intensifies one magnet and lessens the power of the other, as set forth, and the reverse when the polarity is changed, as specified.

5. A condenser, in combination with electro-magnets, rheostats, and constant circuits, substantially as set forth.

6. A perforated paper transmitting apparatus in combination with two electro-magnets, a swinging armature and constant circuits, substantially as set forth, whereby the armature is made to vibrate by the varying power of the electro-magnets resulting from the perforated paper opening and closing one of the circuits, substantially as set forth.

7. A vibrating stylus, moved by the main-line current acting in an electro-magnet, in combination with a local circuit that is closed by the contact of the stylus with the chemical paper and the reverse, substantially as set forth.

Signed by me this 19th day of February, A. D. 1872.

GEORGE LITTLE.

Witnesses:
    GEO. T. PINCKNEY,
    CHAS. H. SMITH.